US012660035B2

(12) United States Patent
Han et al.

(10) Patent No.: US 12,660,035 B2
(45) Date of Patent: Jun. 16, 2026

(54) METHOD AND APPARATUS FOR SIDELINK DRX ALIGNMENT

(71) Applicant: Lenovo (Beijing) Ltd., Beijing (CN)

(72) Inventors: Jing Han, Chaoyang District (CN); Lianhai Wu, Chaoyang (CN); Ran Yue, Haidian District (CN); Jie Hu, Changping District (CN); Haiming Wang, Xicheng District (CN); Jie Shi, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 528 days.

(21) Appl. No.: 18/002,392

(22) PCT Filed: Jul. 10, 2020

(86) PCT No.: PCT/CN2020/101429
§ 371 (c)(1),
(2) Date: Dec. 19, 2022

(87) PCT Pub. No.: WO2022/006885
PCT Pub. Date: Jan. 13, 2022

(65) Prior Publication Data
US 2023/0232492 A1     Jul. 20, 2023

(51) Int. Cl.
H04W 76/28          (2018.01)
H04W 72/02          (2009.01)
(Continued)

(52) U.S. Cl.
CPC .......... H04W 76/28 (2018.02); H04W 72/02 (2013.01); H04W 72/0446 (2013.01); H04W 72/0453 (2013.01)

(58) Field of Classification Search
CPC ................................................. H04W 52/0216
See application file for complete search history.

(56) References Cited

U.S. PATENT DOCUMENTS

| 2018/0019768 A1 | 1/2018 | King et al. |
| 2019/0289662 A1 | 9/2019 | Ishikura et al. |
| (Continued) | | |

FOREIGN PATENT DOCUMENTS

| CN | 110149712 A | 8/2019 |
| EP | 3499975 A1 | 6/2019 |
| (Continued) | | |

OTHER PUBLICATIONS 202080102979.7 , "Foreign Office Action", U.S. Appl. No. 202080102979.7, Jun. 28, 2024, 28 pages.
(Continued)

*Primary Examiner* — Pamit Kaur
(74) *Attorney, Agent, or Firm* — FIG. 1 Patents

(57)          ABSTRACT

Embodiments of the present application relate to a method and apparatus for sidelink DRX alignment. An exemplary method includes: obtaining configuration information indicating at least one DRX configuration for a data, wherein the at least one DRX configuration is associated with a first resource pool; and transmitting or receiving the data based on the at least one DRX configuration indicated by the configuration information. Embodiments of the present application can minimize the power consumption of the UEs as well as ensuring the data transmission among the UEs.

20 Claims, 6 Drawing Sheets

(51) Int. Cl.
H04W 72/0446 (2023.01)
H04W 72/0453 (2023.01)

(56) References Cited

U.S. PATENT DOCUMENTS

| | | | | |
|---|---|---|---|---|
| 2021/0227465 | A1* | 7/2021 | Kung | H04W 76/28 |
| 2023/0068554 | A1* | 3/2023 | Yang | H04W 52/0216 |

FOREIGN PATENT DOCUMENTS

| | | | | | |
|---|---|---|---|---|---|
| EP | 4333519 | A2* | 3/2024 | | H04W 52/02 |
| EP | 4179793 | B1 | 6/2025 | | |
| WO | 2015176251 | A1 | 11/2015 | | |
| WO | 2018028279 | A1 | 2/2018 | | |
| WO | 2018064477 | A1 | 4/2018 | | |

OTHER PUBLICATIONS

"Foreign Office Action", CN Application No. 202080102979.7, Nov. 21, 2024, 16 pages.

Intel Corporation , "Text Proposal for 3GPP TR 36.746 Capturing RAN1 Agreements on FeD2D Study Item", 3GPP TSG RAN WG1 Meeting #90, R1-1715173, Prague, Czech Republic [retrieved Mar. 13, 2023]. Retrieved from the Internet <https://www.3gpp.org/ftp/tsg_ran/WG1_RL1/TSGR1_90/Docs/ >., Aug. 2017, 8 Pages.

PCT/CN2020/101429 , "International Preliminary Report on Patentability", PCT Application No. PCT/CN2020/101429, Jan. 19, 2023, 6 pages.

PCT/CN2020/101429 , "International Search Report and Written Opinion", PCT Application No. PCT/CN2020/101429, Mar. 25, 2021, 7 pages.

Sequans Communications , "Power efficient relay discovery maintenance and establishment", 3GPP TSG-RAN WG2 Meeting #97, R2-1701648, Athens, Greece [retrieved Mar. 13, 2023]. Retrieved from the Internet <https://www.3gpp.org/ftp/tsg_ran/WG2_RL2/TSGR2_97/Docs/>., Feb. 2017, 9 Pages.

20943964.5 , "Extended European Search Report", European Application No. 20943964.5, Mar. 4, 2024, 11 pages.

Huawei , "Some considerations about DRX on PCS", 3GPP TSG RAN WG2#98, R2-1704718, Retrieved from the Internet: <URL:http://www.3gpp.org/ftp/tsg_ran/WG2_RL2/TSGR2_98/Docs/>, May 5, 2017, 4 pages.

Qualcomm Incorporated , et al., "New Solution: QoS aware power efficient PC5 communication", 3GPP Draft; S2-2004714, 3rd Generation Partnership Project (3GPP), <URL:https://ftp.3gpp.org/tsg_sa/WG2_Arch/TSGS2_ 139e_Electronic/Docs/S2-2004714.zip S2-2004714 was 4298r06-pCR TR23#x_New Sol_QoS aware power saving .doc>, Jun. 13, 2020, 3 pages.

* cited by examiner

METHOD AND APPARATUS FOR SIDELINK DRX ALIGNMENT

TECHNICAL FIELD

Embodiments of the present application generally relate to wireless communication technology, especially to a method and apparatus for sidelink (SL) discontinuous reception (DRX) alignment.

BACKGROUND

In RAN #86 meeting, a sidelink enhancement work item is agreed. The necessity of sidelink enhancement has been identified. For vehicle-to-anything (V2X) and public safety, the service requirements and operation scenarios are not fully supported in Release 16 (R16) due to the time limitation.

Power saving enables user equipment (UEs) with battery constraint to perform sidelink operations in a power efficient manner. NR sidelink in R16 is designed based on the assumption of "always-on" when a UE operates sidelink, e.g., only focusing on UEs installed in vehicles with sufficient battery capacity. Solutions for power saving in Release 17 (R17) are required for vulnerable road users (VRUs) in V2X use cases and for UEs in public safety and commercial use cases where power consumption in the UEs needs to be minimized.

Accordingly, one objective for power saving in R17 is achieved by performing sidelink DRX. DRX refers to a working mode for saving power consumption of a UE. For example, generally, in the DRX mode, the UE alternates between an active state and a sleep state (or an inactive state). The UE only turns on the receiver to monitor and receive control information or data when it is in the active state, and turns off the receiver to stop receiving the control information or data when it is in the sleep state.

The alignment among sidelink UEs for DRX is important, such that data is not missed at a receiving (Rx) UE and the power consumption at the Rx UE can be minimized. Therefore, the industry desires an improved technology for sidelink DRX alignment among UEs communicating with each other.

SUMMARY OF THE APPLICATION

Some embodiments of the present application at least provide a technical solution for sidelink DRX alignment.

According to some embodiments of the present application, a method performed by a UE for wireless communication may include: obtaining configuration information indicating at least one sidelink DRX configuration for a data on sidelink, wherein the at least one sidelink DRX configuration is associated with a first resource pool; and transmitting or receiving the data based on the at least one sidelink DRX configuration indicated by the configuration information.

According to some other embodiments of the present application, a method performed by a base station (BS) for wireless communication may include: transmitting configuration information indicating at least one sidelink DRX configuration for a data on sidelink, wherein the at least one sidelink DRX configuration is associated with a first resource pool.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for sidelink DRX alignment, such that data is not missed at the Rx UE and the power consumption at the Rx UE can be minimized.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present application are also applicable to similar technical problems.

Figure 1:
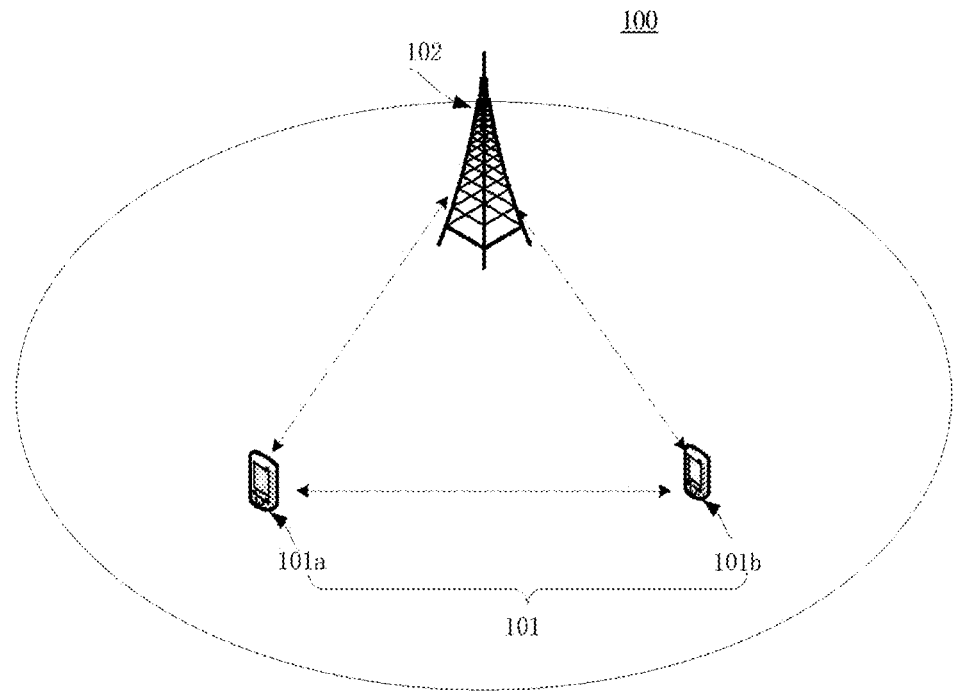
FIG. 1 is a schematic diagram illustrating an exemplary wireless communication system 100 according to some embodiments of the present application.

FIG. 1 is a schematic diagram illustrating an exemplary wireless communication system 100 according to an embodiment of the present application.

As shown in FIG. 1, a wireless communication system 100 includes at least one UE 101 and at least one BS 102. In particular, the wireless communication system 100 includes two UEs 101 (e.g., UE 101a and UE 101b) and one BS 102 for illustrative purpose. Although a specific number of UEs 101 and BS 102 are depicted in FIG. 1, it is contemplated that any number of UEs 101 and BSs 102 may be included in the wireless communication system 100.

According to some embodiments of the present application, the UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

According to some embodiments of the present application, the UE(s) 101 may include vehicle UEs (V-UEs), vulnerable road user (VRUs), public safety UEs (PS-UEs), and/or commercial sidelink UEs (CS-UEs) that sensitive to power consumption. In an embodiment of the present application, a VRU may include a pedestrian UE (P-UE), a cyclist UE, a wheelchair UE or other UEs which requires power saving compared with a V-UE. According to some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via LTE or NR Uu interface.

According to some embodiments of FIG. 1, UE 101*a* functions as transmitting (Tx) UE, and UE 101*b* functions as Rx UE. UE 101*a* may exchange V2X messages with UE 101*b* through a sidelink, for example, PC5 interface as defined in 3GPP TS 23.303. UE 101*a* may transmit information or data to other UE(s) within the V2X communication system, through sidelink unicast, sidelink groupcast, or sidelink broadcast. For instance, UE 101*a* transmits data to UE 101*b* in a sidelink unicast session. UE 101*a* may transmit data to UE 101*b* and other UEs in a groupcast group (not shown in FIG. 1) by a sidelink groupcast transmission session. Also, UE 101*a* may transmit data to UE 101*b* and other UEs (not shown in FIG. 1) by a sidelink broadcast transmission session. In an embodiment of the present application, the UE 101*a* may be a V-UE, the UE 101*b* may be a VRU (e.g., a P-UE or a cyclist UE) or PS-UE or CS-UE.

Alternatively, according to some other embodiments of FIG. 1, UE 101*b* functions as Tx UE and transmits V2X messages, UE 101*a* functions as Rx UE and receives the V2X messages from UE 101*b*.

Both UE 101*a* and UE 101*b* in the embodiments of FIG. 1 may transmit information to BS 102 and receive control information from BS 102, for example, via LTE or NR Uu interface. BS(s) 102 may be distributed over a geographic region. In certain embodiments of the present application, each of BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, where BS(s) 102 transmit data using an OFDM modulation scheme on the downlink (DL) and the UE(s) 101 transmit data on the uplink (UL) or sidelink (SL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

In R17, for the VRUs in V2X use cases and for UEs in public safety and commercial use cases, power saving may be required. In some embodiments of the present application, power saving in R17 may be achieved by performing sidelink DRX. DRX refers to a working mode for saving power consumption of a UE. For example, generally, in the DRX mode, the UE alternates between an active state and a sleep state (or an inactive state). The UE only turns on the receiver to monitor and receive control information or data when it is in the active state, and turns off the receiver to stop receiving the control information or data when it is in the sleep state.

The alignment among sidelink UEs for DRX is important, such that data is not missed at an Rx UE and the power consumption at the Rx UE can be minimized. Given this, one working scope in R17 is to specify mechanism aiming to align sidelink DRX wake-up time (or active time) among the UEs communicating with each other in a broadcast manner, a groupcast manner, or a unicast manner. To specify mechanism of the DRX alignment, there are at least three issues need to be solved. For example, the first issue is how to align the sidelink DRX configuration for UEs communicating with each other in a broadcast manner, a groupcast manner, or a unicast manner, the second issue is how the UEs communicating with each other know when the sidelink DRX configuration is enabled and where sidelink DRX configuration is utilized, and the third issue is what is the Tx UE's behavior after receiving the sidelink DRX configuration.

Accordingly, embodiments of the present application provides a technical solution for sidelink DRX alignment among the UEs communicating with each other through a broadcast manner, a groupcast manner, or a unicast manner, such that data is not missed between the Tx UE and the Rx UE and the power consumptions at the Tx UE and the Rx UE can be minimized. More details on embodiments of the present application will be illustrated in the following text in combination with the appended drawings.

Figure 2:
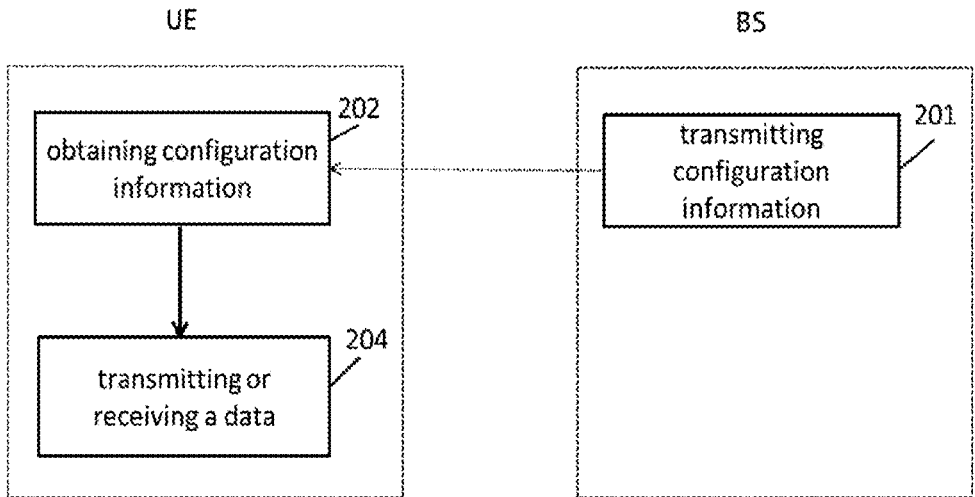
FIG. 2 is a flow chart illustrating a method for sidelink DRX alignment according to some embodiments of the present application.
Figure 3A:
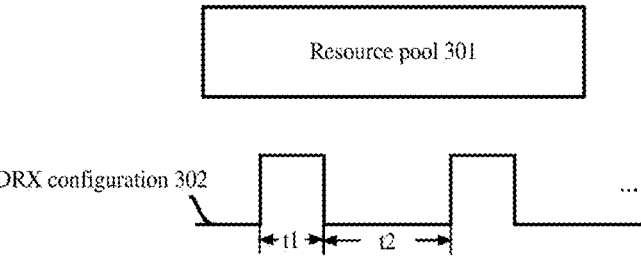
FIGS. 3(a)-3(e) respectively illustrate exemplary examples of at least one sidelink DRX configuration according to some embodiments of the present application.
Figure 3B:
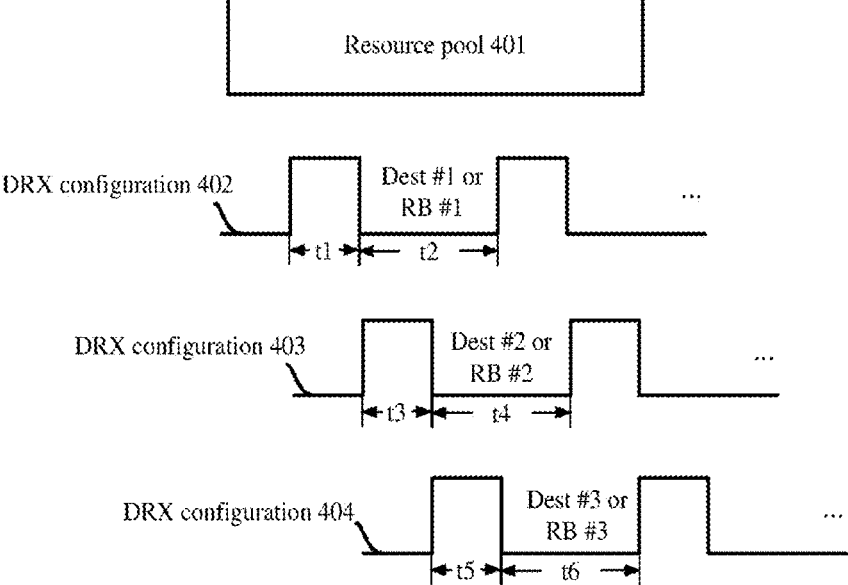
Figure 3C:
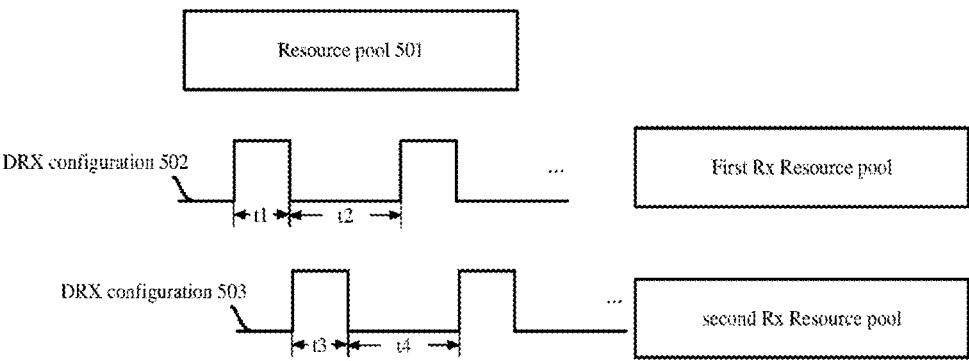
Figure 3D:
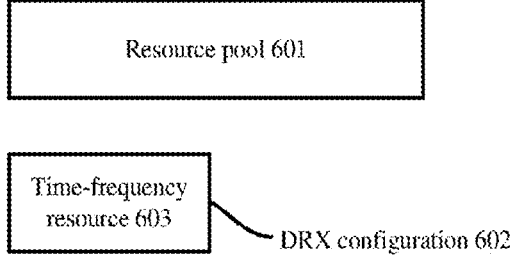
Figure 3E:
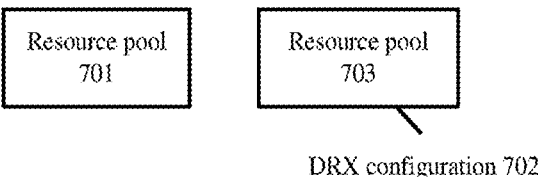

FIG. 2 is a flow chart illustrating a method for sidelink DRX alignment according to some embodiments of the present application. Although the method is illustrated in a system level by the UEs and a BS (e.g., UEs 101 and BS 102 as illustrated and shown in FIG. 1), persons skilled in the art can understand that the method implemented in the UE and that implemented in the BS can be separately implemented and incorporated by other apparatus with the like functions.

In the exemplary method shown in FIG. 2, in step 201, a BS 102 as shown in FIG. 1 may transmit configuration information to the UE(s) 101 (e.g., the UE 101*a* and the UE 101*b*). In step 202, the UEs 101 may obtain the configuration information. According to some embodiments of the present application, obtaining the configuration information may include receiving the configuration information transmitted from the BS 102. In an embodiment of the present application, the configuration information may be broadcasted in a system information block (SIB) of the BS 102. That is, the UE(s) 101 may receive configuration information in the SIB broadcasted by the BS 102. In another embodiment of the present application, the configuration information may be transmitted via a radio resource control (RRC) signaling. That is, the UE(s) 101 may receive configuration information through a RRC signaling transmitted from the BS 102. According to some other embodiments of the present application, the step 201 may be not performed. In these embodiments, the configuration information may be preconfigured in the UE(s) 101, for example, in a subscriber identity module (SIM), in a universal subscriber identity module (USIM), or in a memory of the UE(s) 101. Therefore, obtaining configuration information may refer to access the SIM, USIM or the memory for acquiring the configuration information inside the UE.

The configuration information may indicate at least one sidelink DRX configuration for a data on sidelink. According to some embodiments of the present application, the data may be a specific data. For example, the specific data may include at least one of: a vehicle-to-pedestrian (V2P) data, a sidelink DRX associated data, a power sensitive associated data, and the like.

The at least one sidelink DRX configuration may be associated with a first resource pool. According to some embodiments of the present application, the first resource pool may include at least one of: a transmission resource pool, a reception resource pool, and an exceptional resource pool which may be used for a handover procedure as specified in 3GPP standard documents.

After receiving the configuration information, in step 204, the Tx UE (for example, the UE 101*a*) may transmit the data based on the at least one sidelink DRX configuration indicated by the configuration information. The Rx UE (for example, the UE 101*b*) may receive the data based on the at least one sidelink DRX configuration indicated by the configuration information.

According to some embodiments of the present application, each of the at least one sidelink DRX configuration may include at least one of the following parameters: an on-duration time of a DRX; an off-duration time of a DRX; a wake-up time of a DRX; one or more timers associated with a DRX; a DRX cycle; and a DRX offset value. The wake-up time may also be referred to as the active time.

In an embodiment of the present application, the one or more timers associated with a sidelink DRX may include at least one of: a DRX on-duration timer (such as sl-drx-onDurationTimer as specified in 3GPP standard documents), an DRX inactivity timer (such as sl-drx-InactivityTimer as specified in 3GPP standard documents), and a DRX retransmission timer (such as sl-drx-RetransmissionTimer as specified in 3GPP standard documents).

In an embodiment of the present application, when a sidelink DRX is configured, the active time (or the wake-up time) on sidelink may include the time while one of a DRX on-duration timer for sidelink (such as sl-drx-onDuration-Timer as specified in 3GPP standard documents), an DRX inactivity timer for sidelink (such as sl-drx-InactivityTimer as specified in 3GPP standard documents), and a DRX retransmission timer for sidelink (such as sl-drx-Retrans-missionTimer as specified in 3GPP standard documents) is running.

In some embodiments of the present application, the at least one sidelink DRX configuration may include one sidelink DRX configuration. In these embodiments, the Tx resource pool used for the Tx UE and the Rx resource pool used for the Rx UE may be the same, and the one sidelink DRX configuration may be associated with the Tx resource pool and the Rx resource pool.

For example, FIG. 3(*a*) illustrates an exemplary example of at least one sidelink DRX configuration according to some embodiments of the present application. As shown in FIG. 3(*a*), the Tx resource pool used for the Tx UE and the Rx resource pool used for the Rx UE may be the same, the first resource pool may be represented by the resource pool 301 in FIG. 3(*a*), which may be the Tx resource pool or the Rx resource pool. The configuration information may indicate that one sidelink DRX configuration 302 is associated with the resource pool 301. In an embodiment of the present application, the sidelink DRX configuration 302 may include at least one of the following parameters: an on-duration time of a DRX; an off-duration time (e.g., t2 as shown in FIG. 3(*a*)) of a DRX; a wake-up time (e.g., t1 as shown in FIG. 3(*a*)) of a DRX; one or more timers associated with a DRX; a DRX cycle; and a DRX offset value.

Then, after receiving configuration information, the Tx UE (for example, the UE 101*a*) may transmit the data based on the one sidelink DRX configuration 302. The Rx UE (for example, the UE 101*b*) may receive the data based on the one sidelink DRX configuration 302. For example, the Tx UE and the Rx UE may transmit and receive the data in the on-duration time t1 of the DRX, and may not transmit and receive the data in the off-duration time t2 of the DRX.

In some other embodiments of the present application, the configuration information may indicate that each of the at least one sidelink DRX configuration is associated with one or more destination identities (IDs) or one or more sidelink radio bearers (RBs). Each of the one or more destination IDs may be associated with a traffic with a corresponding quality of service (QoS) requirement.

For example, FIG. 3(*b*) illustrates an exemplary example of at least one sidelink DRX configuration according to some embodiments of the present application. As shown in FIG. 3(*b*), the Tx resource pool used for the Tx UE and the Rx resource pool used for the Rx UE may be the same, the first resource pool may be represented by the resource pool 401 in FIG. 3(*b*), which may be the Tx resource pool or the Rx resource pool. The configuration information may indicate that three sidelink DRX configurations 401, 402, and

403 are associated with the resource pool 401. In an embodiment of the present application, each of the sidelink DRX configurations 402, 403, and 404 may include at least one of the following parameters: an on-duration time of a DRX; an off-duration time (e.g., time t2, t4, or t6) of a DRX; a wake-up time (e.g., time t1, t3, or t5) of a DRX; one or more timers associated with a DRX; a DRX cycle; and a DRX offset value. As shown in FIG. 3(*b*), the sidelink DRX configuration 402 may be associated with one destination ID (e.g., Dest #1) or one radio bearer (RB) (e.g., RB #1), the sidelink DRX configuration 403 may be associated with one destination ID (e.g., Dest #2) or one radio bearer (RB) (e.g., RB #2), and the sidelink DRX configuration 403 may be associated with one destination ID (e.g., Dest #3) or one radio bearer (RB) (e.g., RB #3).

Then, after receiving configuration information, the Tx UE (for example, the UE 101*a*) and the Rx UR (for example, the UE 101*b*) may transmit and receive the data based on the at least one sidelink DRX configurations 402-404. For example, before transmitting a data, the Tx UE may determine a destination ID or a radio bearer associated with the data, and then transmit the data according to the sidelink DRX configuration associated with the destination ID or radio bearer.

In some other embodiments of the present application, the first resource pool may be a transmission resource pool, and the at least one sidelink DRX configuration may include a plurality of sidelink DRX configurations. In these embodiments, after receiving the configuration information, in step 204, the Tx UE (e.g., UE 101*a*) may duplicate the data and transmit the duplicated data in a wake-up time of each sidelink DRX configuration of the plurality of sidelink DRX configurations. In an embodiment of the present application, the above step 204 may be realized by a resource selection procedure, e.g., for a data, performing resource selection on an on-duration time period of each DRX and reserve the resource.

For example, FIG. 3(*c*) illustrates an exemplary example of at least one sidelink DRX configuration according to some embodiments of the present application. As shown in FIG. 3(*c*), the first resource pool may be represented by the resource pool 501 in FIG. 3(*c*), which may be the Tx resource pool. The configuration information may indicate that two sidelink DRX configurations 502 and 503 are associated with the resource pool 501. The sidelink DRX configuration 502 may be associated with a first Rx resource pool, the sidelink DRX configuration 503 may be associated with a second Rx resource pool.

In an embodiment of the present application, each of the sidelink DRX configurations 502 and 503 may include at least one of the following parameters: an on-duration time of a DRX; an off-duration time (e.g., time t2 and t4) of a DRX; a wake-up time (e.g., time t1 and t3) of a DRX; one or more timers associated with a DRX; a DRX cycle; and a DRX offset value.

Then, after receiving configuration information, the Tx UE (for example, the UE 101*a*) may duplicate the data to be transmitted, and transmit the duplicated data in the wake-up times (e.g., time t1 and t3) of sidelink DRX configurations 502 and 503.

In some other embodiments of the present application, the at least one sidelink DRX configuration may indicate a time-frequency resource for the data. The time-frequency resource may be a part of the first resource pool. That is, the at least one sidelink DRX configuration defines the on-duration time of the first resource pool for transmitting and receiving the specific data (e.g., a V2P data, a sidelink DRX associated data, or a power sensitive associated data). In these embodiments, after receiving the configuration information, in step 204, the Tx UE (e.g., UE 101*a*) and the Rx UE (e.g., UE 101*b*) may transmit and receive the data on the time-frequency resource. In an embodiment of the present application, the time-frequency resource may be referred to as an Rx resource pool.

In an embodiment of the present application, the at least one sidelink DRX configuration may include at least one of the following parameters: a parameter (for example, a new parameter sl-timeresoureceV2P which is similar as sl-timeresourece-r16 as specified in 3GPP standard documents) indicating a bitmap which indicates a time domain resource within the first resource pool; a parameter (for example, sl-StartRB-Subchannel-r16 and sl-NumSubchannel-r16 as specified in 3GPP standard documents) indicating a frequency domain resource within the first resource pool; and a parameter (for example, SL-SelectionWindowConfig as specified in 3GPP standard documents) indicating a resource selection window for the first resource pool.

For example, FIG. 3(*d*) illustrates an exemplary example of at least one sidelink DRX configuration according to some embodiments of the present application. As shown in FIG. 3(*d*), the first resource pool may be represented by the resource pool 601 in FIG. 3(*d*), which may be the Tx resource pool. The configuration information may indicate a sidelink DRX configuration 602 is associated with the resource pool 601. The sidelink DRX configuration 602 indicates a time-frequency resource 603. As shown in FIG. 3(*d*), the time-frequency resource 603 is a part of the resource pool 601.

Then, after receiving configuration information, the Tx UE (e.g., UE 101*a*) and the Rx UE (e.g., UE 101*b*) may transmit and receive the data on the time-frequency resource 603.

In some other embodiments of the present application, the BS may configure separated tx and rx resource pool for transmitting and receiving a specific data (e.g., a V2P data, a sidelink DRX associated data, or a power sensitive associated data). In these embodiments, the at least one sidelink DRX configuration indicates a second resource pool different from the first resource pool. When the Tx UE (e.g., UE 101*a*) needs to transmit a data (e.g., a transport block), the Tx UE will firstly check whether it is a specific data. In the case that the data to be transmitted is a specific data, the Tx UE may select the second resource pool for transmitting the data. Correspondingly, the Rx UE (e.g., the UE 101*b*) may receive the data on the second resource pool.

For example, FIG. 3(*e*) illustrates an exemplary example of at least one sidelink DRX configuration according to some embodiments of the present application. As shown in FIG. 3(*e*), the first resource pool may be represented by the resource pool 701 in FIG. 3(*d*). The configuration information may indicate a sidelink DRX configuration 702 is associated with the resource pool 701. The sidelink DRX configuration 702 indicates a second resource pool 703 which is used for the specific data. In an embodiment of the present application, the resource pools 701 and 703 are both Tx resource pools. In another embodiment of the present application, the resource pools 701 and 703 are both Rx resource pools.

Then, after receiving configuration information, when the Tx UE (e.g., UE 101*a*) needs to transmit a data, the Tx UE will firstly check whether it is a specific data. In the case that the data to be transmitted is a specific data, the Tx UE may select the resource pool 703 for transmitting the data.

Correspondingly, the Rx UE (e.g., the UE 101b) may receive the data on the resource pool 703.

In some other embodiments of the present application, the UEs may communicate with each other by a groupcast manner. That is, each UE may belong to a group including at least one UE. In these embodiments, the configuration information may indicate that each of the at least one sidelink DRX configuration is associated with a group of UEs. Then, after receiving configuration information, when the Tx UE (e.g., UE 101a) needs to transmit a data, the Tx UE will firstly check the group to which it belongs, and then transmit the data based on the sidelink DRX configuration associated with the group. Similarly, the Rx UE (e.g., UE 101b) may receive a data based on the sidelink DRX configuration associated with a group to which the Rx UE belongs.

In some other embodiments of the present application, the configuration information may indicate a mapping relationship between the at least one sidelink DRX configuration and at least one destination identities (IDs). That is, the BS may indicate UE that the data of which destination id(s) will be configured with sidelink DRX. Then, after receiving configuration information, when the Tx UE (e.g., UE 101a) needs to transmit a data, the Tx UE will firstly check whether the data is related to a destination ID associated with a sidelink DRX configuration. In the case that the data is related to a destination ID associated with a sidelink DRX configuration, the Tx UE may transmit the data based on the sidelink DRX configuration associated with the destination ID.

In some other embodiments of the present application, the configuration information may indicate a mapping relationship between the at least one sidelink DRX configuration and at least one sidelink radio beares (SLRBs). That is, the BS may indicate a UE that the data of which SLRB(s) will be configured with sidelink DRX. Then, after receiving configuration information, when the Tx UE (e.g., UE 101a) needs to transmit a data, the Tx UE will firstly check whether the data is related to a SLRB associated with a sidelink DRX configuration. In the case that the data is related to a SLRB associated with a sidelink DRX configuration, the Tx UE may transmit the data based on the sidelink DRX configuration associated with the SLRB.

In existing technology, before transmitting a data, the Tx UE (e.g., UE 101a) may perform a resource section or resection procedure to select the resource for transmitting the data. However, the existing resource section or resection procedure is without considering the sidelink DRX configuration.

In some embodiments of the present application, a specific data configured with a DRX is employed. For the specific data configured with a DRX, the Tx UE may merely trigger a resource section or resection procedure during a wake-up time of the DRX. That is, in these embodiments, before performing a resource selection or resource reselection for transmitting a data, the Tx UE may check, in a medium access control (MAC) of the Tx UE, whether a condition is fulfilled. The condition may include: the data being a data configured with a sidelink DRX configuration (or being a specific data), and the Tx UE being in a wake-up time of the sidelink DRX configuration. Once the condition is fulfilled, the UE may perform the resource selection or resource reselection for transmitting the data.

According to embodiments of the present application, the resource (re)selection process described in TS 38.321 may change. Specifically, passages marked with underline (addition) throughout the following sections illustrate changes to the resource (re)selection process described in TS 38.321.

1> if the data is a specific data associated with a DRX, if a sidelink DRX functionality is configured or reconfigured by upper layers, and if the UE is in a SL active time of the DRX;

2> clear the configured sidelink grant associated to the Sidelink process, if available;

2> trigger the TX resource (re-)selection.

In some embodiments of the present application, for a data (e.g., a specific data) associated with a sidelink DRX configuration, the Tx UE may determine a resource for transmitting the data based on a wake-up time (or an active time) of the sidelink DRX configuration. In an embodiment of the present application, the Tx UE may only select the resource in SL DRX wake-up time for specific data transmission. In other words, the available resource for transmitting the specific data is determined only in the SL DRX active time.

Figure 4A:
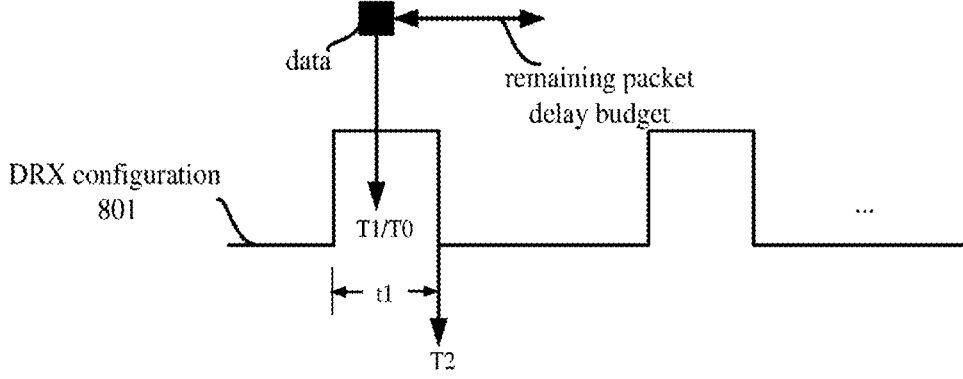
FIG. 4(a)-4(b) respectively illustrate exemplary examples of resource selection according to some embodiments of the present application.

For example, FIG. 4(a) illustrates an exemplary example of resource selection according to some embodiments of the present application. As shown in FIG. 4(a), the configuration information may indicate a sidelink DRX configuration 801 is used for a data. For example, the data may be a specific data (e.g., a V2P data, a sidelink DRX associated data, or a power sensitive associated data). Then, at a certain time T0, the Tx UE may have a data (e.g., a TB) to be transmitted. When determining the available resource for transmitting the data, the Tx UE may determine the resource within a time interval [n+T1, n+T2] as the available resource for transmitting the data, wherein n is the time that a higher layer trigger the resource selection, or a slot in which the higher layer provides parameters for this physical sidelink shared channel (PSSCH)/physical sidelink control channel (PSCCH) transmission.

T1 may be determined by a MAC layer of the Tx UE based on the wake-up time (e.g., t1 as shown in FIG. 4(a)) of the sidelink DRX configuration 801. As shown in FIG. 4(a), T0 is within the wake-up time t1 of the sidelink DRX configuration 801, and thus the Tx UE may determine T1 to be T0. T2 may be determined based on a remaining packet delay budget and the wake-up time (e.g., t1 as shown in FIG. 4(a)) of the sidelink DRX configuration 801. For example, T2 may be the smaller one of the above two values. Referring to FIG. 4(a), the remaining packet delay budget is larger than the wake-up time of the sidelink DRX configuration 801, the Tx UE may determine T2 to be the wake-up time of the sidelink DRX configuration 801.

Figure 4B:
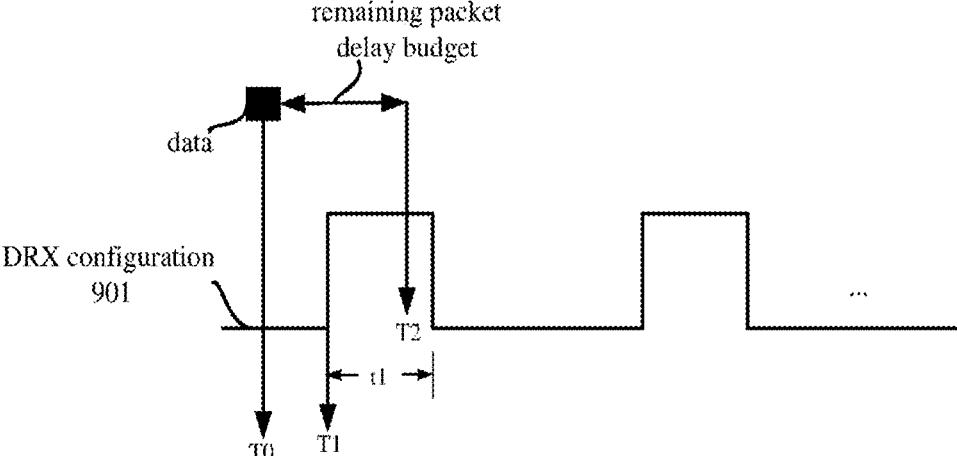

FIG. 4(b) illustrates another exemplary example of resource selection according to some embodiments of the present application. As shown in FIG. 4(b), the configuration information may indicate a sidelink DRX configuration 901 is used for a data. For example, the data may be a specific data (e.g., a V2P data, a sidelink DRX associated data, or a power sensitive associated data). Then, at a certain time T0, the Tx UE has a data (e.g., a TB) to be transmitted. When determining the available resource for transmitting the data, the Tx UE may determine the resource within a time interval [n+T1, n+T2] as the the available resource for transmitting the specific data, wherein n may refer to a number of a subframe.

T1 may be determined by a MAC layer of the Tx UE based on the wake-up time (e.g., t1 as shown in FIG. 4(b)) of the sidelink DRX configuration 801. As shown in FIG. 4(b), T0 is before the wake-up time t1 of the sidelink DRX configuration 801. Therefore, the Tx UE may determine T1 to be a starting point of the wake-up time t1. T2 may be determined based on a remaining packet delay budget and the wake-up time (e.g., t1 as shown in FIG. 4(b)) of the sidelink DRX configuration 801. For example, T2 may be the smaller one of the above two values. Referring to FIG. 4(b), the remaining packet delay budget is smaller than the wake-up time t1 of the sidelink DRX configuration 801, and thus T2 may be determined as the remaining packet delay budget.

In some embodiments of the present application, during a logical channel prioritization (LCP) procedure, the Tx UE may only select the destination(s) that relate to a specific data transmission. For example, during destination selection in LCP, UE only select destination that relates to specific data transmission when UE is in active time of a DRX. In these embodiments, during a logical channel prioritization (LCP) procedure, the Tx UE may select a destination in the case that the destination is related to the data associated with a sidelink DRX configuration and the UE is in a wake-up time of the sidelink DRX configuration.

According to embodiments of the present application, the LCP procedure described in TS 38.321 may change. Specifically, passages marked with underline (addition) throughout the following sections illustrate changes to the LCP procedure described in TS 38.321.

The MAC entity shall for each sidelink control information (SCI) corresponding to a new transmission:

> 1> select a Destination associated to one of unicast, groupcast and broadcast, having the logical channel with the highest priority or the MAC CE, among the logical channels that satisfy all the following conditions and MAC CE(s), if any, for the SL grant associated to the SCI:
>> 2> SL data is available for transmission; and
>> 2> SBj>0, in case there is any logical channel having SBj>0; and
>> 2> sl-configuredSLGrantType1Allowed, if configured, is set to true in case the SL grant is a Configured Grant Type 1; and
>> 2> if destination is related to a data transmission associated with a sidelink DRX configuration (or a specific data transmission), and UE is in an active time (or a wake-up time) of the sidelink DRX configuration.

Figure 5:
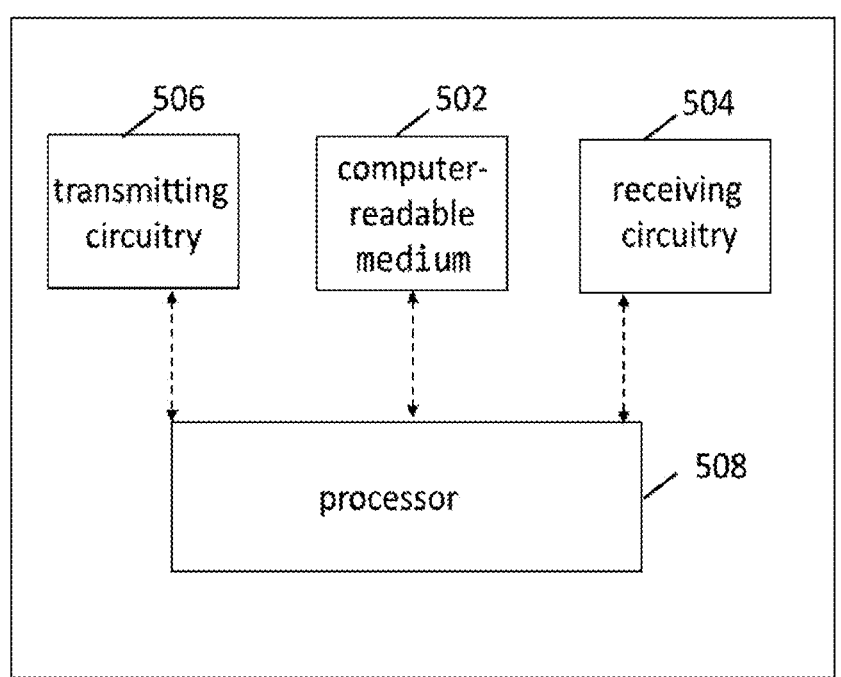
FIG. 5 illustrates a simplified block diagram of an apparatus for sidelink DRX alignment according to some embodiments of the present application.

FIG. 5 illustrates a simplified block diagram of an apparatus 500 for sidelink DRX alignment according to some embodiments of the present application. The apparatus 500 may be a BS 102 or a UE 101 (e.g., UE 101a or UE 101b) as shown in FIG. 1.

Referring to FIG. 5, the apparatus 500 may include at least one non-transitory computer-readable medium 502, at least one receiving circuitry 504, at least one transmitting circuitry 506, and at least one processor 508. In some embodiment of the present application, at least one receiving circuitry 504 and at least one transmitting circuitry 506 and be integrated into at least one transceiver. The at least one non-transitory computer-readable medium 502 may have computer executable instructions stored therein. The at least one processor 508 may be coupled to the at least one non-transitory computer-readable medium 502, the at least one receiving circuitry 504 and the at least one transmitting circuitry 506. The computer executable instructions can be programmed to implement a method with the at least one receiving circuitry 504, the at least one transmitting circuitry 506 and the at least one processor 508. The method can be a method according to an embodiment of the present application, for example, the method shown in FIG. 2.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method performed by a user equipment (UE), the method comprising:

obtaining configuration information indicating a sidelink discontinuous reception (DRX) configuration associated with a sidelink radio bearer, wherein the sidelink DRX configuration comprises an active time associated with a transmission or a reception of data on a sidelink;

selecting, during a logical channel prioritization (LCP) procedure and based at least in part on the data being related to the sidelink radio bearer, a destination based at least in part on the UE being within the active time of the sidelink DRX configuration; and performing the transmission of the data on the sidelink based at least in part on the sidelink DRX configuration and the destination.

2. The method of claim 1, wherein the configuration information is at least one of preconfigured in the UE, broadcast in a system information block (SIB), or received via a radio resource control (RRC) signaling.

3. The method of claim 1, wherein the sidelink DRX configuration comprises at least one of:

an on-duration time;

an off-duration time;

a wake-up time;

one or more timers associated with a DRX;

a DRX cycle; or a DRX offset value.

4. The method of claim 1, wherein the configuration information indicates the sidelink DRX configuration is associated with one or more destination identities (IDs) or one or more sidelink radio bearers comprising the sidelink radio bearer.

5. The method of claim 1, wherein the configuration information comprises a plurality of sidelink DRX configurations associated with a transmission resource pool, and wherein the method further comprises:

duplicating the data; and transmitting the duplicated data in a wake-up time of each sidelink DRX configuration of the plurality of sidelink DRX configurations.

6. The method of claim 1, wherein the sidelink DRX configuration indicates a time-frequency resource for the data, wherein the time-frequency resource is a part of a resource pool, and wherein the method further comprises transmitting the data on the time-frequency resource.

7. The method of claim 1, wherein the sidelink DRX configuration comprises at least one of:

a first parameter comprising a bitmap that indicates a time domain resource within a resource pool;

a second parameter comprising a frequency domain resource within the resource pool; or a third parameter comprising a resource selection window for the resource pool.

8. The method of claim 7, wherein the sidelink DRX configuration indicates an additional resource pool different from the resource pool, and wherein the method further comprises transmitting the data based at least in part on the additional resource pool.

9. The method of claim 1, wherein the configuration information indicates a mapping relationship between the sidelink DRX configuration and at least one destination identity (ID).

10. A user equipment (UE) for wireless communication, comprising:

at least one memory; and at least one processor coupled with the at least one memory and operable to cause the UE to:

obtain configuration information indicating a sidelink discontinuous reception (DRX) configuration associated with a sidelink radio bearer, wherein the sidelink DRX configuration comprises an active time associated with transmission or reception of data on a sidelink;

select, during a logical channel prioritization (LCP) procedure and based at least in part on the data being related to the sidelink radio bearer, a destination based at least in part on the UE being within the active time of the sidelink DRX configuration; and perform the transmission of the data on the sidelink based at least in part on the sidelink DRX configuration and the destination.

11. A network equipment (NE) for wireless communication, comprising:

at least one memory; and at least one processor coupled with the at least one memory and operable to cause the NE to transmit configuration information indicating a sidelink discontinuous reception (DRX) configuration associated with a sidelink radio bearer, wherein the sidelink DRX configuration comprises an active time associated with a transmission or a reception of data on a sidelink, wherein a destination is selected during a logical channel prioritization (LCP) procedure based at least in part on a user equipment (UE) being within the active time of the sidelink DRX configuration and based at least in part on the data being related to the sidelink radio bearer.

12. The NE of claim 11, wherein:

the sidelink DRX configuration comprises at least one of an on-duration time, an off-duration time, a wake-up time, one or more timers associated with a DRX, a DRX cycle, or a DRX offset value; and the configuration information indicates that the sidelink DRX configuration is associated with one or more destination identities (IDs) or one or more sidelink radio bearers comprising the sidelink radio bearer.

13. The NE of claim 11, wherein the configuration information comprises a plurality of sidelink DRX configurations associated with a transmission resource pool.

14. The NE of claim 11, wherein the sidelink DRX configuration indicates a time-frequency resource for the transmission of the data, and wherein the time-frequency resource is a part of a resource pool.

15. The UE of claim 10, wherein the configuration information is at least one of preconfigured in the UE, broadcast in a system information block (SIB), or received via a radio resource control (RRC) signaling.

16. The UE of claim 10, wherein:

the sidelink DRX configuration comprises at least one of an on-duration time, an off-duration time, a wake-up time, one or more timers associated with a DRX, a DRX cycle, or a DRX offset value; and the configuration information indicates that the sidelink DRX configuration is associated with one or more destination identities (IDs) or one or more sidelink radio bearers.

17. The UE of claim 10, wherein the configuration information comprises a plurality of sidelink DRX configurations associated with a transmission resource pool, and wherein the at least one processor is further operable to cause the UE to:

duplicate the data; and transmit the duplicated data in a wake-up time of each sidelink DRX configuration of the plurality of sidelink DRX configurations.

18. The UE of claim 10, wherein the sidelink DRX configuration indicates a time-frequency resource for the data, wherein the time-frequency resource is a part of a resource pool, and wherein the at least one processor is further operable to cause the UE to one of:

transmit the data on the time-frequency resource; or receive the data on the time-frequency resource.

19. The UE of claim 10, wherein the sidelink DRX configuration comprises at least one of:

a first parameter comprising a bitmap that indicates a time domain resource within a resource pool;

a second parameter comprising a frequency domain resource within the resource pool; or a third parameter comprising a resource selection window for the resource pool.

20. A method performed by a network equipment (NE), the method comprising transmitting configuration information indicating a sidelink discontinuous reception (DRX) configuration associated with a sidelink radio bearer, wherein the sidelink DRX configuration comprises an active time associated with transmission or reception of data on a sidelink, wherein a destination is selected during a logical channel prioritization (LCP) procedure based at least in part on a user equipment (UE) being within the active time of the sidelink DRX configuration and based at least in part on the data being related to the sidelink radio bearer.

\*  \*  \*  \*  \*